United States Patent
Boudreau et al.

(10) Patent No.: US 10,462,803 B2
(45) Date of Patent: Oct. 29, 2019

(54) CONTROL SIGNALING FOR DEVICE TO DEVICE COMMUNICATION

(71) Applicant: Telefonaktiebolaget LM Ericsson (publ), Stockholm (SE)

(72) Inventors: Gary Boudreau, Kanata (CA); Hossein Seyedmehdi, Kanata (CA)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 15/761,354

(22) PCT Filed: Sep. 25, 2015

(86) PCT No.: PCT/IB2015/057403
§ 371 (c)(1),
(2) Date: Mar. 19, 2018

(87) PCT Pub. No.: WO2017/051222
PCT Pub. Date: Mar. 30, 2017

(65) Prior Publication Data
US 2018/0263046 A1 Sep. 13, 2018

(51) Int. Cl.
H04W 72/12 (2009.01)
H04W 72/14 (2009.01)
(Continued)

(52) U.S. Cl.
CPC ....... H04W 72/121 (2013.01); H04W 52/383 (2013.01); H04W 72/14 (2013.01); H04W 76/14 (2018.02)

(58) Field of Classification Search
CPC . H04W 72/121; H04W 52/383; H04W 72/14; H04W 76/14
See application file for complete search history.

(56) References Cited

U.S. PATENT DOCUMENTS

2011/0275382 A1* 11/2011 Hakola ............... H04W 24/10
455/452.2
2013/0012221 A1* 1/2013 Zou ..................... H04W 72/10
455/452.1
(Continued)

FOREIGN PATENT DOCUMENTS

WO 2011050519 A1 5/2011
WO 2014089745 A1 6/2014

OTHER PUBLICATIONS

International Search Report and Written Opinion for International Patent Application No. PCT/IB2015/057403, dated Jun. 14, 2016, 10 pages.

Primary Examiner — Kodzovi Acolatse
Assistant Examiner — Jay L Vogel
(74) Attorney, Agent, or Firm — Sage Patent Group

(57) ABSTRACT

A method for a network node for Device-to-Device (D2D) communication is provided. The method comprises identifying a D2D control condition for broadcasting a control signal to a group of D2D user devices. The method also comprises broadcasting the control signal to the group of D2D user devices, based on the identified control condition, wherein the control signal includes a resources history field indicative of a set of physical resources previously allocated to the group of D2D user devices. A method for a user device is also provided. The method comprises performing a D2D initialization procedure. The method further comprises receiving a D2D broadcast control signal from a network node.

20 Claims, 11 Drawing Sheets

(51) Int. Cl.
*H04W 52/38* (2009.01)
*H04W 76/14* (2018.01)

(56) References Cited

U.S. PATENT DOCUMENTS

| | | |
|---|---|---|
| 2014/0254401 A1 | 9/2014 | Talwar et al. |
| 2015/0373651 A1* | 12/2015 | Ryu .................... H04W 52/245 |
| | | 455/522 |
| 2016/0249297 A1* | 8/2016 | Oh ........................ H04W 76/14 |
| 2016/0323870 A1* | 11/2016 | Wei ...................... H04W 72/042 |
| 2017/0126543 A1* | 5/2017 | Wang ...................... H04L 41/12 |

\* cited by examiner

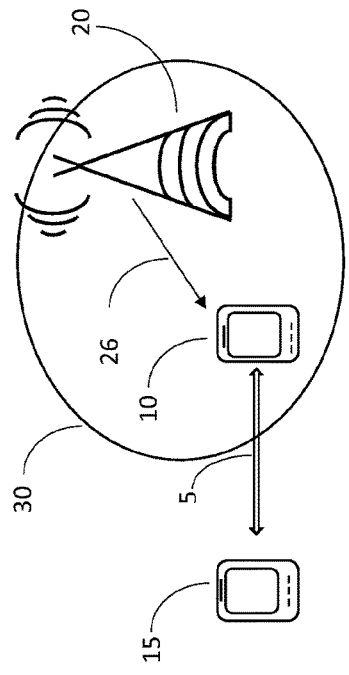
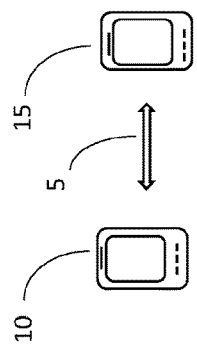
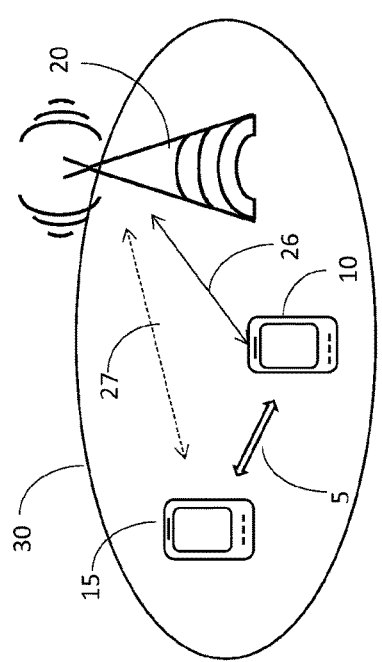
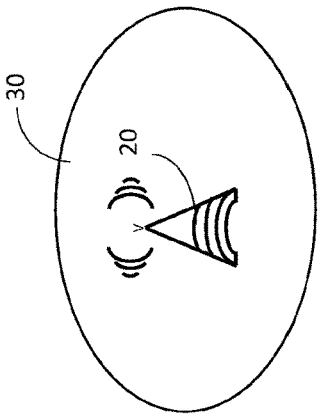
FIGURE 1A (Prior Art)
FIGURE 1B (Prior Art)
FIGURE 1C (Prior Art)

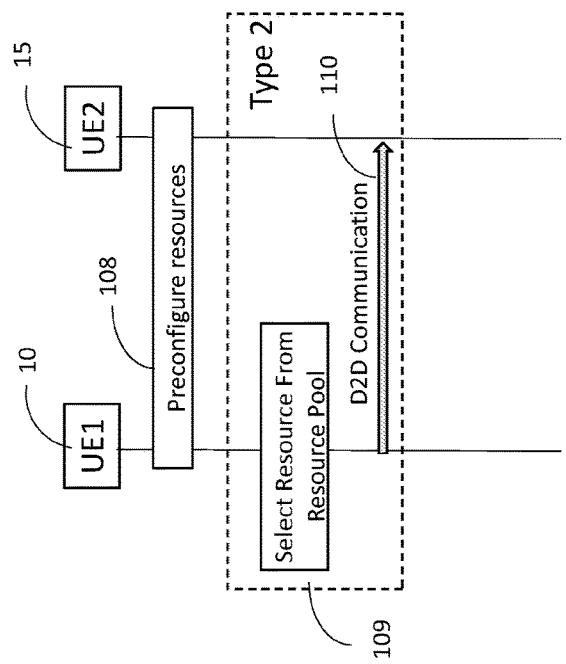
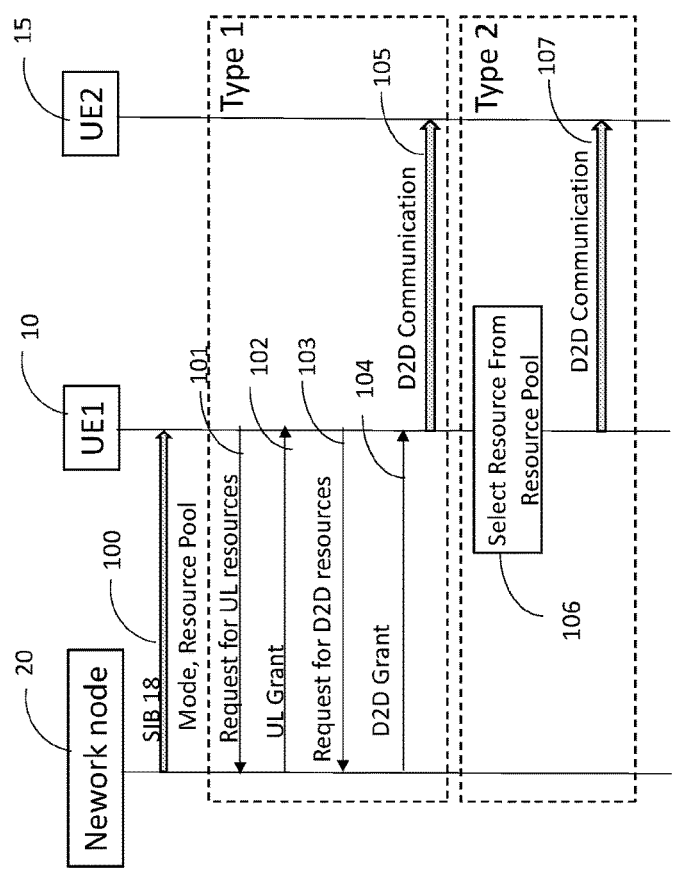
FIGURE 2B
FIGURE 2A

CONTROL SIGNALING FOR DEVICE TO DEVICE COMMUNICATION

This application is a 35 U.S.C. § 371 national phase filing of International Application No. PCT/IB2015/057403, filed Sep. 25, 2015, the disclosure of which is incorporated herein by reference in its entirety.

TECHNICAL FIELD

The present disclosure relates to device-to-device (D2D) communication and in particular to control signaling for D2D communication.

BACKGROUND

Device-to-device (D2D) communication has been developed to meet growing capacity demands due to rapid growth of wireless data services. In a D2D communication scenario, two user equipment (UEs) devices directly communicate with each other without having the payload traversed through the backhaul network. D2D communication is a promising feature that can potentially scale the capacity of the network, improve network resource utilization, such as network throughput, spectrum utilization, reduce transmission delays and offload traffic from the network nodes, as well as improve coverage for user terminals (UE's) that do not have network coverage.

The performance and advantages of D2D communication is currently an active topic of investigation in 3GPP (3rd Generation Partnership Program) RAN (Radio Access Network) forums, for use in wireless communications technologies such as those governed by 3GPP (LTE (Long Term Evolution) and LTE-Advanced (LTE-A) standards.

D2D communication may be bi-directional, where both user terminals receive and transmit using the same or different resources. D2D communication may also be used in a scenario where one of the user terminals transmits and the other one receives the signals. Still further, D2D communication may be used in a point-to-multipoint scenario, such as for example multicast, or broadcast communications, when a plurality of devices receive signals from the same transmitting device. This scenario is particularly useful for emergency services or public safety operation to spread vital information to several devices in an affected area. Still further, D2D communications may be used also for local social networks, content sharing, advertising, and various mobile-to-mobile applications.

In some wireless systems, the D2D UEs operate under the supervision of a radio access network, referred to as cellular network assisted D2D communications. In this case, UEs in the vicinity of each other can establish a direct radio link, i.e. a D2D direct bearer. This direct radio link is referred to as 'network (NW) link' or a 'D2D-NW link'. The D2D-NW link is used for example for resource assignment for D2D communication, maintenance of radio link quality of D2D communication link, etc. While UEs communicate over the D2D-NW link, they also maintain a cellular connection with their respective serving eNB. Furthermore, in some scenarios, D2D UEs may operate to establish direct communication without the intervention of the network infrastructure.

The specification uses the term 'network node' for any kind of network equipment including but not limited to eNodeB's (eNB), Node B's (NB), base stations (BS), wireless access points (AP), base station controllers (BSC), radio network controllers (RNC), relay, donor node controlling relays, base transceiver stations (BTS), transmission points, transmission nodes, remote radio units (RRU), remote radio heads (RRH), nodes in distributed antenna system (DAS), core network nodes, mobility management entities (MME), etc.

The term 'D2D capable UE' or 'D2D wireless UE' or D2D wireless device' is used in this specification for any type of wireless device, which is capable of at least D2D communication through a wireless link. In some embodiments, the UE may be a mobile communication device, a subscriber station, or another device that is configured to communicate with a wireless system in conformance with an appropriate protocol. Examples of such D2D wireless devices could be sensors, modems, smart phones, machine type (MTC) devices, PDAs, iPADs, tablets, laptop embedded equipment (LEE), laptop mounted equipment (LME), USB dongles, etc.

The D2D devices that communicate with each-other are called in some instance a 'D2D pair', and the communication between the D2D wireless devices of the pair is referred to as 'D2D communication', which takes place along a 'D2D link'.

The specification also uses the term 'wireless access network (WAN) UE', or 'WAN device' to a device that is capable to UL and DL communication with a network node. Example of these devices are, as for the D2D devices, smart phones, MCT devices, PDAs, iPADs, tablets, LEE, LME, USB dongles, sensors, modems, etc. The term 'candidate WAN UE' or 'candidate WAN device' is used for a WAN device that is considered by the network node as a candidate to share the transmission resources with a D2D pair. The communication between the WAN devices and the network node is referred to as 'WAN communication' which takes place along a 'WAN link'.

Although terminology from 3GPP LTE (or E-UTRAN) is used herein, this should not be seen as limiting the embodiments described here to LTE systems only. Other wireless systems, including WCDMA, UTRA FDD, UTRA TDD, and GSM/GERAN/EDGE and other current and future technologies, may also benefit from exploiting the ideas covered within this disclosure. Furthermore, this description may apply to scenarios in which network nodes employ differing radio access technologies (RATs). In some embodiments, short-range technologies, such as Bluetooth or Wi-Fi may be used. In other embodiments, D2D operation may reuse licensed LTE spectrum or unlicensed LTE spectrum. D2D communication may be non-transparent to the wireless system and may occur on a cellular spectrum (i.e. in-band), or unlicensed spectrum (i.e. out-band).

The embodiments described refer to D2D wireless devices are applicable to single carrier or multi-carrier or carrier aggregation based D2D communication.

As well, in the context of this specification, the term 'downlink' (DL) is used for the transmission from a network node to a user device, and the term 'uplink' (UL) is used for the transmission from a user device to a network node.

SUMMARY

In some of the currently known D2D communication techniques, the transmitting device (in the D2D pair) is assigned an identifier (e.g., in LTE a D2D-RNTI is used, where RNTI means Radio Network Temporary Identifier) and scheduled on a certain set of resources (e.g. LTE's Physical Resource Blocks (PRBs)), similar to the scheduling of the WAN UEs. This approach requires grant and control signaling for each individual D2D pair. In case of massive D2D deployment, the signaling overhead would quickly take up the majority of signaling resources.

Accordingly, there is a need in the art to reduce the scheduling and power control signaling overhead for the D2D pairs, to facilitate massive D2D deployment.

There is also a need to enable WAN UEs to utilize D2D reserved spectrum, thus increasing the capacity of the cellular network.

There is also a need to avoid unnecessary or additional performance degradation of the other UEs and/or network nodes that could be potentially caused by the transmissions from the D2D UEs.

To address some of the above identified needs, a new control signaling method from the eNB is introduced to enable co-channel transmission of a plurality of D2D pairs using the same PRBs as well as possibly co-channel reuse of the same PRBs by WAN UEs. The new signaling method enables scalability in the D2D deployment by controlling an arbitrary number of D2D pairs using a reduced amount of overhead, compared to existing solutions. In addition, methods for a network node and/or a D2D UE to enable reduction of the interference to the eNB and/or other WAN UEs are also proposed.

According to one embodiment, a method for in-coverage D2D UE's to be overlaid with WAN UE's in a semi-supervised manner to share PRBs and minimize interference to themselves and other WAN UEs is provided.

In one embodiment, a method for a network node for D2D communication is provided. The method comprises identifying a device-to-device (D2D) control condition for broadcasting a control signal to a group of device-to-device (D2D) user devices. The method also comprises broadcasting the control signal to the group of device-to-device (D2D) user devices, based on the identified control condition, wherein the control signal includes a resources history field indicative of a set of physical resources previously allocated to the group of D2D user devices.

According to one embodiment, a method for a user device is also provided. The method for the user device comprises performing a D2D initialization procedure. The method further comprises receiving a D2D broadcast control signal from a network node.

According to other embodiments, network nodes, user devices, computer programs, computer program products are also provided.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 1A, 1B and 1C illustrate three possible D2D coverage scenarios, namely 'In-Coverage', 'Partial Coverage' and 'Out-of-Coverage' scenarios;

FIGS. 2A and 2B illustrate the existing LTE Release 12 standardized D2D communication procedures, wherein FIG. 2A shows the control messages for the 'D2D Transmit In-Coverage' case as in FIG. 1A, and FIG. 2B shows the control messages for the 'D2D Transmit out-of-Coverage' case shown in FIG. 1C;

DETAILED DESCRIPTION

Figure 3:
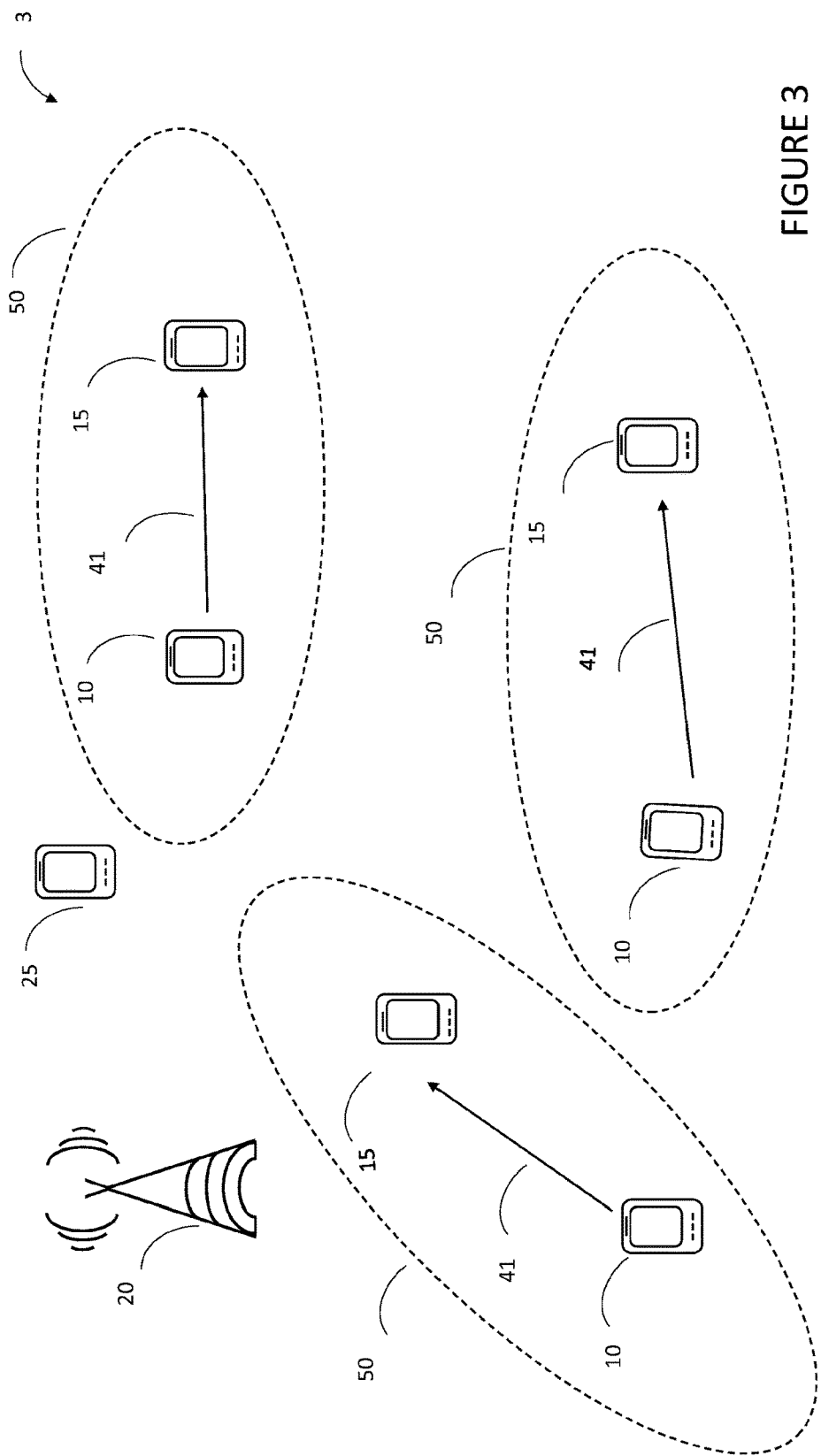
FIG. 3 shows an example of a D2D communication for a group of D2D user devices, for which the embodiments described herein may apply.

The embodiments set forth below represent information to enable those skilled in the art to practice the embodiments and illustrate the best mode. A number of exemplary embodiments will be presented. It should be noted that these embodiments are not mutually exclusive. Components from one embodiment may be tacitly assumed to be present in another embodiment and it will be obvious to a person skilled in the art how those components may be used in the other exemplary embodiments.

FIGS. 1A, 1B, 1C, 2B and 2C illustrate three existent coverage scenarios for D2D communication.

An example of an in-coverage scenario is shown in FIG. 1A. In this scenario, also called in-network (IN) coverage, the D2D communications are under network coverage. FIG. 1A shows D2D UEs 10 and 15 in the coverage area 30 of network node 20, exchanging D2D communications among themselves on D2D link 5. In this scenario, D2D wireless device 10 also maintains a WAN communication link with the network, as shown by line 26. D2D device 10 operates in a D2D mode for communications with D2D device 15, and operates in a WAN (UL/DL) mode with the network node 20. Alternatively or at the same time, D2D device 15 may also have a WAN communication link with network node 20, as shown by the dotted line 27.

An example of partial coverage scenario is shown in FIG. 1B. In this scenario, also called partial-network (PN) coverage, at least one D2D wireless device, e.g. UE 15, is not under the network coverage, and the other D2D wireless device, e.g. UE 10, is under the network coverage. The D2D wireless device 15 not being under the network coverage can be due to various factors, such as lack of any network node in its vicinity or insufficient resources in any of the network nodes in its vicinity. On the other hand, D2D wireless device 10 may have an established WAN link 26 with the network node 20.

An example of an out-of-coverage scenario is shown in FIG. 1C. In this scenario, also called out-of-network (OON) coverage, the D2D wireless devices 10 and 15 communicate with each other and are not under network node coverage so that the network cannot provide any assistance to the devices 10 and 15. FIG. 1C illustrates that the D2D UEs 10 and 15 do not and cannot receive signals from and/or transmit signals to the network node 20 (or any other network nodes, not shown). As for the PN coverage case, the lack of coverage may be due to various factors, such as complete absence of the network coverage in the vicinity of the D2D UEs 10 and 15, the distance between de UEs and the network node, the geography of the space, insufficient resources in the network nodes to serve or manage the D2D UEs, etc.

The current standardization of D2D in LTE Release 12 defines two basic types (or modes) of D2D communication for in-coverage D2D scenarios shown in FIG. 1A. Type 1 (aka Mode 1) D2D communication is controlled by a serving eNB or primary cell (PCell) eNB in a carrier aggregation scenario. In particular, the physical resource blocks (PRBs) that are employed by the D2D transmission are controlled and scheduled by the serving eNB. Type 2 (aka Mode 2) D2D communication is based on use of reserved PRB's for D2D only and is contention based. The current specification of D2D in LTE Release 12 specifies the uplink channel as the medium for D2D communication.

FIGS. 2A and 2B illustrate the LTE Release 12 standardized D2D communication procedures. In these Figures, the network node is denoted with 20, as in the previous illustrations, D2D UE 10 of a D2D pair operates as a transmitting D2D UE, and D2D UE 15 of the D2D pair operates in this example as the receiving D2D UE. FIG. 2A shows control messages for the 'D2D Transmit In-Coverage' case (scenario shown in FIG. 1A and FIG. 1B), where the network node 20 may control the D2D UE transmit power in conjunction with assigning scheduled transmission resources for the D2D communication, as for the D2D Type 1 communication.

In the in-coverage embodiment (see FIG. 1A) and partial coverage embodiment (see FIG. 1B), the network node 20 provides the UE 10, in the area of coverage of node 20, with control information to enable activation of D2D communications, shown at 100 on FIG. 2A. In general, UE 10 may be configured to enable D2D functionality upon receiving a special System Information Block (SIB) message from the network node 20. This may be for example a SIB 18 signal, used in LTE networks to provide authorization for D2D operation, configuration information for D2D operation, assistance information for preferred spectrum for D2D operation, or/and assistance information for D2D synchronization source set-up.

In Type 1 D2D communication, as shown at 101 on FIG. 2A, UE 10 transmits to network node 20 a request for uplink transmission resources. For example, this request may be a scheduling request similar to SR in legacy LTE procedures, such as a dedicated scheduling request (D-SR) or a scheduling request sent on the Random Access Channel (RACH).

On receipt of an uplink grant from the network node 20, shown at 102, UE 10 uses this UL grant to transmit to network node 20 a request for D2D transmission resources (i.e. resources for Proximity Services or ProSe communication), as shown at 103. For example, this can be a message similar to the BSR (Buffer Status Report) in legacy LTE procedures.

In response to the request, the network node 20 allocates further resources to the D2D UE pair for the D2D communication and D2D UE 10 receives from the network node 20 this allocation, as shown by the D2D grant message, in step 104.

At step 105, D2D communication between UE 10 and UE 15 takes place, using the D2D transmission resources allocated by the network node 20 in step 104 for D2D Type 1 Transmit In-Coverage.

For Type 2 D2D communication, the network node 20 broadcasts information about a pool of resources that may be shared by the UEs that attempt to establish D2D communication. The resource pools may be provided via system information broadcast (SIB) messaging. In this case, the transmitting UE 10 selects the transmission resources for D2D communication from the resource pool, as shown at 106. The resource selection by UE 10 may be in contention with other D2D UEs in the network. If successful in securing the selected resources, the pair of D2D wireless devices, 10 and 15, will use the selected resources for the D2D communication, as shown at 107.

FIG. 2B shows the control messages for the 'D2D Transmit out-of-Coverage' case shown in FIG. 1C. This uses a D2D communication similar to Type 2, but in this case, the resource pool configuration is obtained from a pre-configuration of resources, as shown at 108. The transmitting D2D UE 10 selects the transmission resources from the preconfigured resource pool, shown at 109, possibly in contention with other D2D UEs in the proximity. If successful in securing the selected preconfigured resources, the pair of D2D wireless devices 10 and 15 will use the selected resources, for a D2D communication 110 among themselves.

As noted above, current D2D communication techniques present a number of problems in terms of signaling overhead for massive D2D deployment, deprivation of spectrum for WAN UE's, lack of control over D2D transmitting power in some D2D scenarios (e.g. Type 2) etc. Some embodiments of the present disclosure are directed to addressing some of these drawbacks.

In particular, according to some embodiments a control signaling method is provided to enable co-channel transmission of a plurality of D2D pairs using the same PRBs as well as possibly co-channel reuse of the same PRBs by WAN UEs. The method enables scalability in the D2D deployment by controlling an arbitrary number of D2D pairs using a reduced amount of overhead, compared to existing solution. The method may also allow control of the interference to an eNB or other WAN UEs from D2D communication.

FIG. 3 shows an example of a wireless network 3 for which the embodiments described herein may apply. Wireless network 3 comprises network node 20 and a group of D2D user devices 10, 15. The D2D user devices are grouped into a plurality of D2D pairs 50, with each pair 50 comprising at least one transmitting D2D user device 10 and a receiving D2D user device 15. Within a D2D pair 50, D2D wireless devices 10 and 15 communicate directly with each other, as shown by signal 41. In the following, the network node 20 is also referred to as an eNB, the D2D wireless devices 10 and 15 are referred to as D2D wireless devices, D2D user devices or D2D UE's. Optionally, network 3 may also comprise at least one WAN user device 25 in WAN communication or attempting WAN communication with network node 20. Although WAN user device 25 is not involved in D2D communication with any of the D2D pairs 50, it may share or attempt to share transmission resources with one or more the D2D pairs 50. WAN user device 25 is also referred herein as a WAN device, WAN user device or WAN UE. Also, the transmission resources used by WAN UEs and D2D UEs within network 3 are alternatively referred to as physical resources or PRBs (Physical Resource Blocks). Although not shown, each D2D pair 50 may actually be a D2D 'cluster' comprising more than two D2D devices that have D2D communication among themselves. Within a cluster, some D2D devices 10 may transmit to more than one D2D device 15 and/or some D2D devices 15 may receive from more than one D2D device 10. Finally, within a D2D pair 50, a D2D user device 10 transmitting at one time may also be a D2D user device 15 receiving at another time and/or from another D2D device.

For a given D2D pair 50, three scenarios, overlay, scheduled D2D communications and contention based D2D communication are described next. An overlay scenario is when the D2D pair uses the same transmission resources as those used by the WAN user device 25. Scheduled D2D operation takes place when the D2D pair receives from the network node 20 a specific grant to transmit. The grant message received from the network node 20 indicates the physical resource block(s) (PRB(s)) that the D2D pair can use for D2D transmission. That is, the time and the frequency resources are indicated in the grant message. Contention based D2D takes place when the D2D pair does not receive a specific grant from the network node for transmission, rather physical resources are allocated to a group of D2D UEs that use those PRBs on a contention basis.

In addition to the existent Type 1 and Type 2 D2D communication defined, some embodiments of the present disclosure provide D2D communication techniques according to a third type (mode) of D2D communication, referred herewith as Type 3, or In-Coverage Overlay Semi-Supervised D2D communication: The D2D pair 50 is in coverage, but it does not wait for a grant from the eNB 20 (e.g. an RNTI grant). However, the D2D transmission within the D2D pair is not completely un-supervised either and the eNB 20 may controls the behavior of the D2D transmitting user devices 10, as further described. According to some embodiments, Type 3 can be viewed as a super set of Type 2, i.e. Type 2 can be considered as a special case of Type 3 when there is no WAN UE 25 that shares or PRB's. Therefore, some Type 3 control signaling presented herein which does not involve a WAN UE, can be applied to Type 2 D2D communication.

Figure 4:
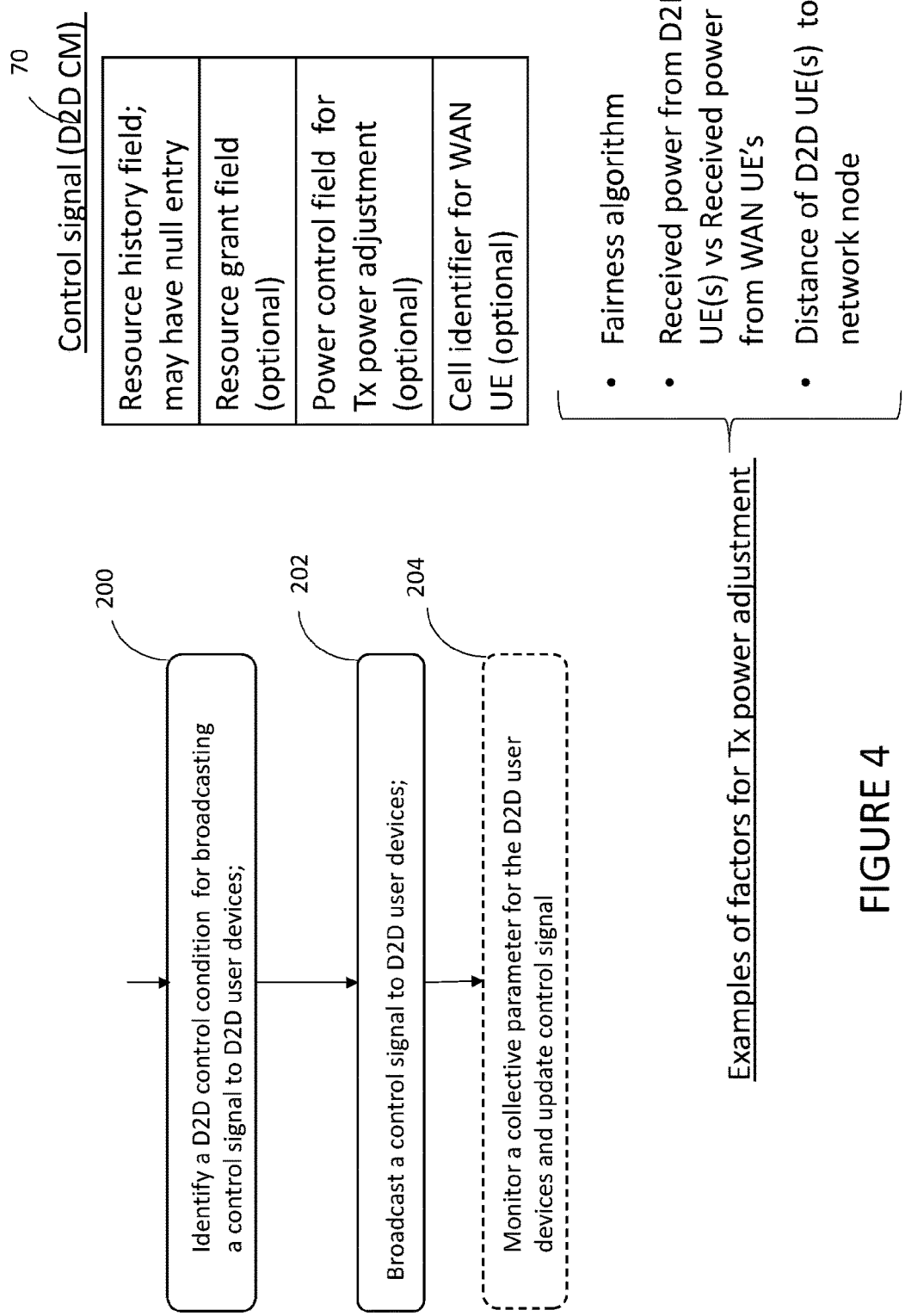
FIG. 4 illustrates a flowchart of a method of D2D communication for a network node, according to an embodiment of the present disclosure.
Figure 5:
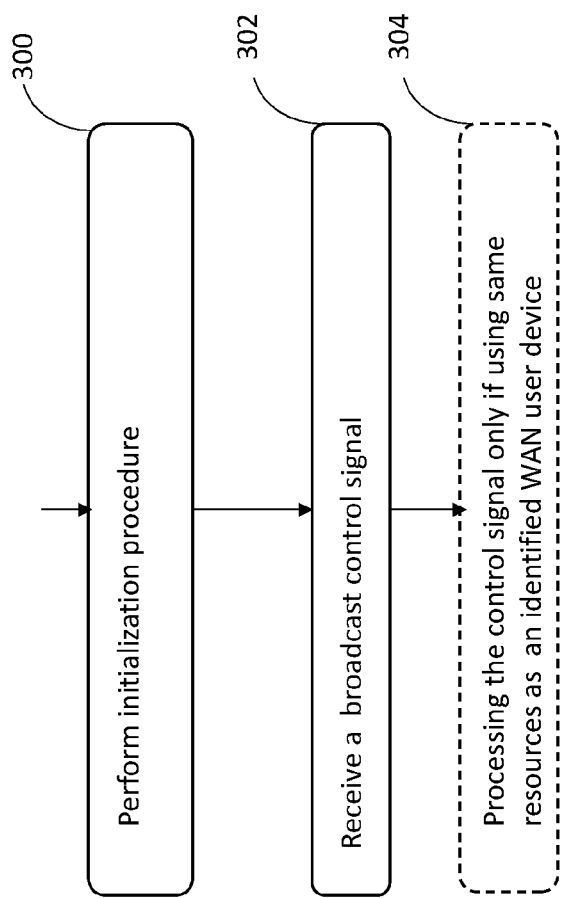
FIG. 5 illustrates a flowchart of a method of D2D communication for a D2D user device, according to another embodiment of the present disclosure.

FIGS. 4 and 5 illustrate flowcharts of methods of D2D communication from the network node 20 perspective and from the perspective of D2D user device 10, according to embodiments of the present disclosure.

In FIG. 4, at step 200, the network node 20 identifies a device-to-device (D2D) control condition (200) for broadcasting a D2D control signal 70 to a group of in-coverage device-to-device (D2D) user devices within a group of D2D pairs. For example, the identification of the D2D control condition can be identifying a high demand for D2D communication within the cell(s) associated with the network node 20. The D2D control signal 70 is also referred herein as D2D Control Message (D2D-CM).

Upon identifying the D2D control condition, at step 202, the network node 20 broadcasts the control signal 70 to the group of device-to-device (D2D) user devices 10. 1. By broadcasting the control signal 70, the network node 20 enables what is referred herein as an "In-coverage Overlay Semi-supervised multi D2D" type/mode or Type 3 for in-coverage D2D transmitting UEs 10. The control signal 70 includes at least a resources history field (history_based_identifier) indicative of a set of physical resources previously allocated to the group of D2D user devices. The resources history field may have at least one null entry that indicates no physical resources have been previously allocated to at least one of the D2D user devices in the group of D2D user devices. According to specific embodiments, the control signal 70 from the network node 20 can have a variable number of recipient D2D devices 10, and in some cases, it is possible for the network node 20 to be agnostic about the number of the D2D pairs 50 targeted (and affected) by the control signal 70.

The control signal 70 comprises a history field as its main purpose is to indicate to the group of D2D user devices PRB's previously allocated to the group, in order to facilitate reuse of these PRB's. According to more specific embodiments and as illustrated, the control signal 70 may further comprise any one or any combination of a power control field (transmission_power_adjustment), a resource grant field (granted_prbs) and a cell identifier. The resources grant field is indicative of a set of physical resources to be used by the group of D2D user devices in subsequent communication. The power control field is indicative of a set of transmitter power adjustments to be made by the group of D2D user devices in subsequent communication. The cell identifier corresponds to at least one wireless access network (WAN) user device attached to the network node 20. Additional specific embodiments of the control signals and of each of these fields will be described in more detail below.

Optionally, as per step 204, the network node 20 may monitor a collective parameter for the group of D2D user devices 10 and update the control signal based on the results of the monitoring. In one embodiment, the collective parameter is either one or a combination of received power from each D2D user device 10 in the group of D2D user devices 10 and the interference from each such device. Thus, according to one embodiment, the transmitter power of D2D user devices 10 in the group is adjusted for subsequent transmissions, via the power control field in the control signal 70, based on the collective received power and/or interference from the D2D user devices at the network node 20 during past transmissions. Thus, a feedback loop is enabled: the received power and/or interference at the network node 20 for current and past transmission are observed and D2D user devices 10 are instructed to adjust their transmit power in some upcoming/subsequent transmission. In some specific instances, based on the collective received power and/or interference in a certain PRB, the network node 20 instructs the D2D transmitting user devices 10 that have used that PRB to adjust their transmit power and determines the next set of PRBs to be used by those D2D devices 10.

The transmitter power adjustments may be set according to one or a combination of factors. As illustrated, some examples of such factors, include, without being limited to: a fairness algorithm, a relation between the received power from D2D UE(s) at the eNB 20 and, possibly, the received power from one or more WAN UE's 25 that would want to use the same PRB's, and the distance from the eNB 20 of the D2D user devices 10. Advantages that may be derived from using some of these factors will be described in more detail later on.

While FIG. 4 illustrates a flow chart for a method performed by network node 20 according to an embodiment of the present disclosure, FIG. 5 illustrates a flowchart for a corresponding method of D2D communication for a D2D user device 10, according to another embodiment of the present disclosure. At step 300, the D2D user device 10 performs an initialization procedure, to initiate D2D communication. As part of the initialization procedure, the D2D user device 10 may select a serving eNB 20 within the wireless network 3. A particular initialization procedure is described in more detail later on. After the initialization procedure, at step 302, the D2D user device 10 receives a broadcast control signal 70 (or D2D C-M) from the network node 20. The control signal 70, D2D-CM, has been illustrated and discussed in connection with FIG. 4. The D2D user device 10 will perform subsequent D2D communication based on the received control signal 70. This may involve selection of certain transmission resources as specified within a resource grant field (grant_prb) of the D2D CM and/or transmitter power adjustment as specified in a power control field (transmission_power_adjustment) of the D2D CM. If the D2D CM comprises a cell identifier, at optional step 306, the D2D UE 10 further processes the control signal 70 only if it determines that it uses the same transmission resources as the WAN user device identified in the control signal 70 via the cell identifier.

Further specific implementations and variations of the methods illustrated in FIGS. 4 and 5 are presented next. According to one particular embodiment, the eNB 20 operates as follows:

Step A: The eNB enables the "In-coverage Overlay Semi-supervised multi D2D" Type (Mode) 3 communication by broadcasting a message to all in-coverage D2D transmitting UEs. The decision whether to activate this mode could be made if the eNB is made aware of high demand for D2D communication in its cell.

Step B: Based on a scheduling algorithm in the eNB 20 and the received interference information, the eNB 20 broadcasts one or multiple D2D Control Message(s) (D2D-CM). The one or multiple D2D Control Message(s) (D2D-CM) determine which transmission resources are allocated to the D2D communication and what power level they can use.
  a) If the experienced level of interference is high in a certain transmission resource (or set of PRBs) due to D2D transmissions, a POWER_DOWN message is sent by the eNB 20 (as part of the D2D-CM(s), via power control field(s)). As a result, all the transmitting D2D UEs 10 for which the message is intended, will divide their transmit power for the next transmission by a factor power_down_factor. In one embodiment, this factor may be a constant number (e.g., two), and in another embodiment, this factor may be broadcasted. The resource for the next transmission is also determined in the D2D-CM(s), via resource grant field(s).
  b) If the experienced level of interference is low in a certain transmission resource (or set of PRBs), meaning that the eNB 20 can tolerate more interference, a POWER_UP message is sent (as part of the D2D-CM(s), via power control field(s)). As a result, all the transmitting D2D UEs 10 for which the message is intended, will increase their transmit power by a factor In one embodiment, the factor may be a constant. In another embodiment, the factor may be proportional to their distance to the eNB 10.

Step C: The eNB 10 monitors the aggregated interference and signal levels on each of the transmission resources allocated to the D2D communication. In LTE, this information is readily available at the eNB 20 since the D2D communication is performed over the UL channel.

Step D: The eNB 20 goes back to step B.

Since the power increase in Step B (b) is additive and the power decrease in step B (a) is multiplicative, the above power adjustment method is also called an additive increase multiplicative decrease (AIMD) method. An AIMD method exhibits advantageous properties in terms of fairness which are explained later on.

In the described embodiments, the network connected WAN UEs (e.g. via LTE's Radio Resource Control (RRC) procedure) may be known to the network by some identifier, e.g. a temporary identifier such as RNTI. However, the D2D pairs 50 may not need to be assigned an identifier, e.g. a D2D-RNTI, from the network since they do not transmit anything to the network node 20.

D2D-CM

D2D-CM 70 is received by all in-coverage D2D pairs 50 and is deciphered and acted upon by the intended D2D UEs within these pairs 50. In some specific embodiments, D2D-CM 70 comprises the following fields:

history_based_identifier: In this portion of the message, a set of PRBs previously employed by D2D UEs 10 are indicated. For example, this indication could be through a reference to the time and frequency of a previous D2D transmission. Therefore, this field may comprise the following sub-fields:
  a. Time: This subfield indicates the time of the previous transmission by the D2D pairs 50. In one embodiment, this subfield could indicate the offset Transmission Time Interval (TTI) to the current TTI. In another embodiment, this could be the TTI index in a radio frame. In one embodiment, this subfield could be omitted and a fixed time offset could be used.
  b. Frequency resource: This subfield indicates the index of the PRB. A null historic_based_identifier field, i.e. history_based_identifier=null, may indicate that the message is intended for the D2D pairs 50 that have not had any transmission over a time span in the past, such as determined by a threshold, e.g. inactivation_span_threshold. Such a threshold will be described in more detail in conjunction with the scenario of considering D2D UE's with no previous transmission.

C-RNTI of an attached cellular UE: In one embodiment, this field is used so that the eNB 20 announces the C-RNTI of an attached WAN UE 25 as the reference. In this case, all the D2D UE's 10 that have used the PRBs assigned to the specified WAN UE 25 will be the target for this D2D-CM.

transmission_power_adjustment: This field may take on any of the following two values:
  a. POWER_UP: requests the D2D UE 10 to increase it transmitter power (with respect to the previous transmission) by a constant increment. In one embodiment, the increment amount is set beforehand through a system constant, and in another embodiment, the increment amount is included in the D2D CM (or another message). In another embodiment, the increase is proportional to the distance of the transmitting device in the D2D pair to the eNB. That is, the farther the device is the higher the increment would be, and vice versa.
  b. POWER_DOWN: requires the D2D to divide their transmit power by a factor. In one embodiment, this factor is set beforehand through a system constant, and in another embodiment, this factor is included in this message. If history_based_identifier=null: this field may be discarded by the D2D UE 10. 4. granted_prbs: This field indicates PRBs to be used for the next transmission. This field may have the same subfields as the historic_based_identifier, field, ie.:
  a. Time: This subfield indicates the time offset in which the transmission will happen. In one embodiment, the time subfield is omitted and D2D UEs 10 use a periodic and predetermined time offset.
  b. Frequency resource:
  In one embodiment, this field is eliminated (or not used) and the D2D UEs 10 retain the previous resources. In another one, this field indicates a new set of resources to be used by the D2D UEs 10.

In one embodiment, the decision to power up or down the D2D transmissions is made by the eNB 20 and can be based on the relative receive power from the D2D UE's transmissions as compared to the receive power from the WAN UE 25 transmission. The eNB 20 may target having a Δpower difference between the D2D and WAN received signals greater than some threshold threshold1. The value of said threshold may be predetermined, set by the network, or calculated using a function f=(received power of WAN, received power of D2D, CQI, . . . ).

According to some proposed embodiments, the interference level at the eNB 20 can be more easily managed. Based on the control signal 70, the D2D UEs that have previously transmitted can be called to continue to transmit by indicating their previous PRBs within the resource_history field of the control signal 70. Therefore, the eNB 20, having monitored the previous transmission PRBs, can decide whether to power up the D2D UE's or power them down. For instance, in the previous transmission in a certain PRB, if there was too much interference at the eNB 20, the eNB 20 can broadcast a control signal with a power down command to all those D2Ds so that they power down in the next transmission.

According to some of the embodiments of the present disclosure, D2D pairs 50 may have the opportunity to transmit potentially without having to go through the attachment process.

Fairness Issue

One aspect of some proposed embodiments is that there is no individual control over the transmission power of D2D UE's. That is, a batch of D2D user devices receives the same "power up" or "power down" messages. A problem may arise if a D2D UE that starts with relatively high transmit power, cannibalizes other D2D pairs that are using the same PRBs. One way to avoid this situation from occurring is by enabling an operation according to proposed embodiments to achieve steady state fairness by utilizing distributed processing and iterative feedbacks from the eNB 20 (in the form of POWER_UP/DOWN). That is, after multiple rounds of power control, all the D2D pairs 50 end up with roughly the same transmit power proportional to their distance to the eNB, and the reason is the employment of the additive increase multiplicative decrease (AIMD) of the transmit power of the D2D devices.

Figure 6:
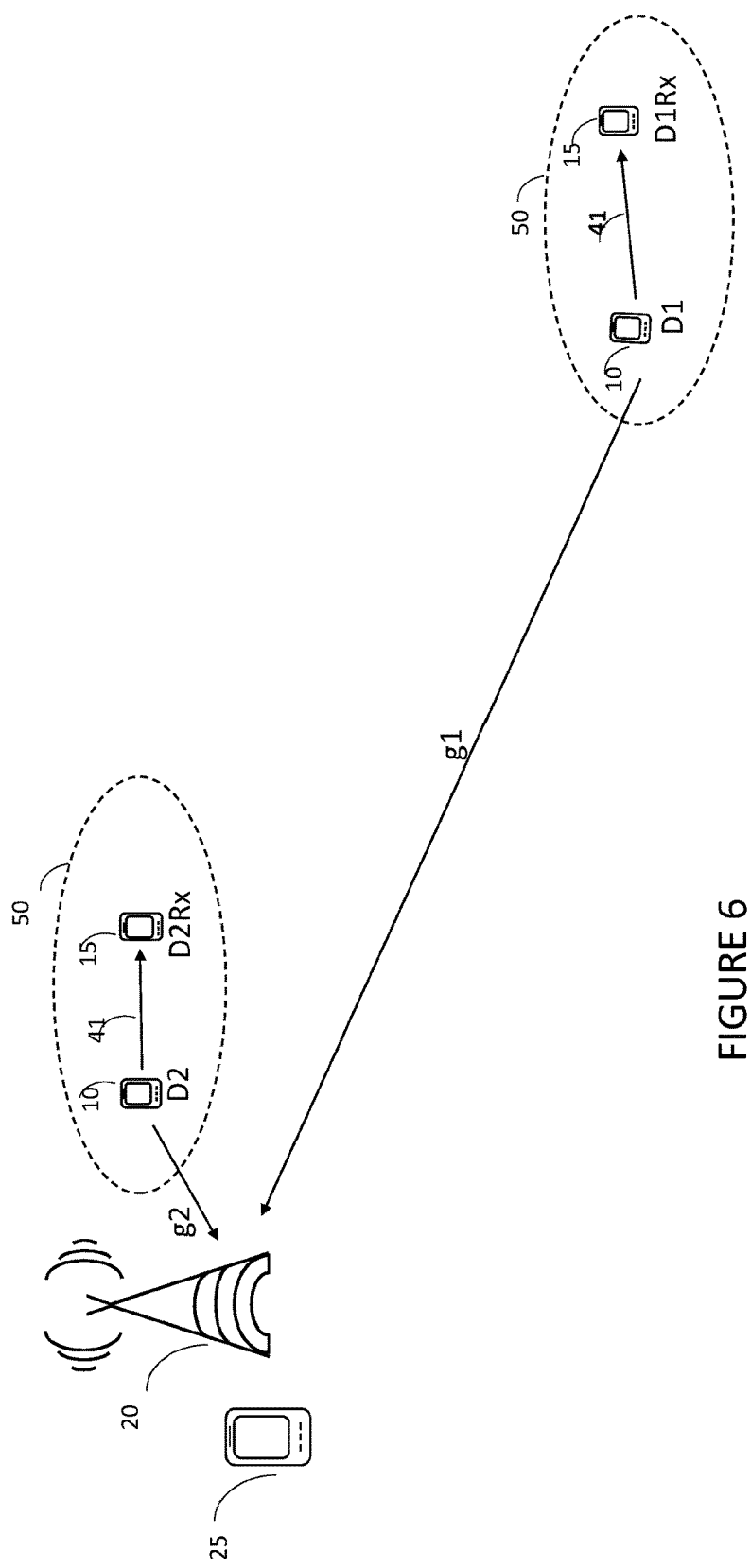
FIG. 6 illustrates a wireless network in which D2D transmitter power control using an additive increase multiplicative (AIMD) algorithm may be used, according to an embodiment of the present disclosure.
Figure 7:
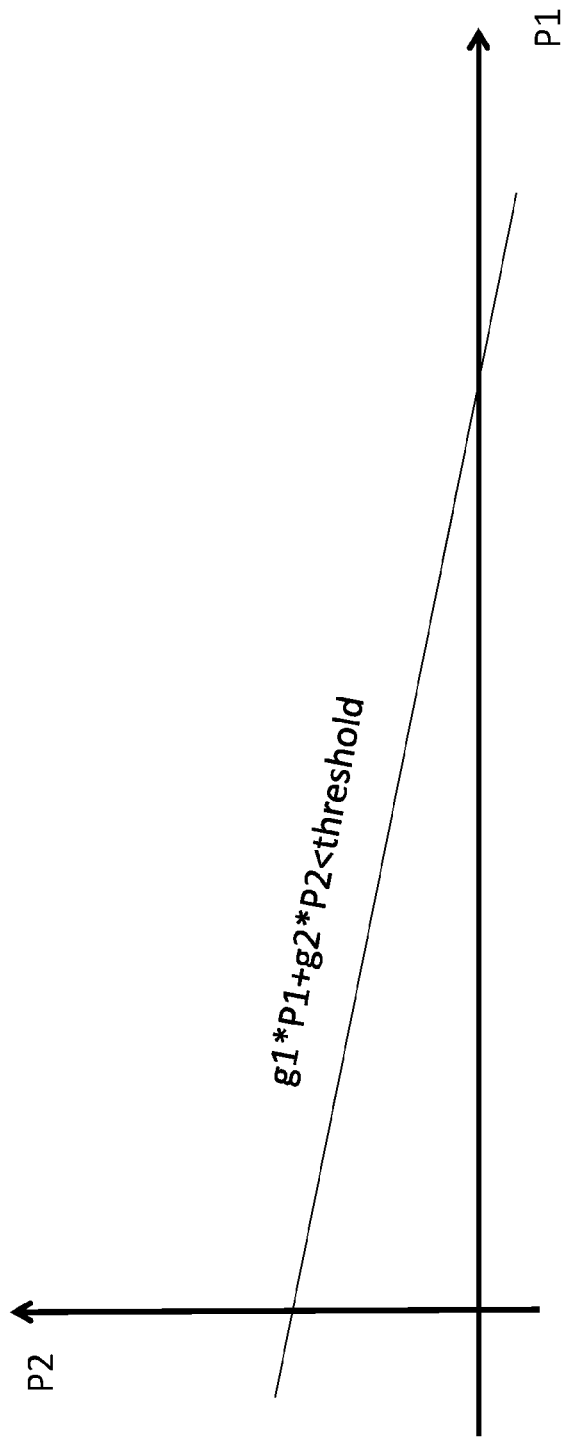
FIG. 7 is a graphic representation of a relationship of transmit powers and path gains for the network in FIG. 6.

The AIMD approach is illustrated in conjunction with FIG. 6 in which D2D pair 1, having transmitting D2D UE D1 is far from the eNB 20 and another D2D pair 2, having transmitting D2D UE D2 is close to the eNB 20. D1 is transmitting with power P1. D2 is transmitting with power P2. g1 is channel power gain from D1 to the eNB. In this example, it is assumed that g2>g1. d1: the distance of the first D2D to the eNB d2: the distance of the second D2D to the eNB. In this case, the distance can be a physical distance, which can be computed for example through GPS signals, or it can be an "electrical distance" which can be determined, for example, by measurement of SINR (Signal to Noise Ratio), RSRP (Reference Signal Received Power), SRS (Sounding Reference Signal), RSRQ (Reference Signal Received Quality) or other similar measurements. As further illustrated in FIG. 7, the sum of received powers at the eNB 20 must be less than a threshold.

Figure 8:
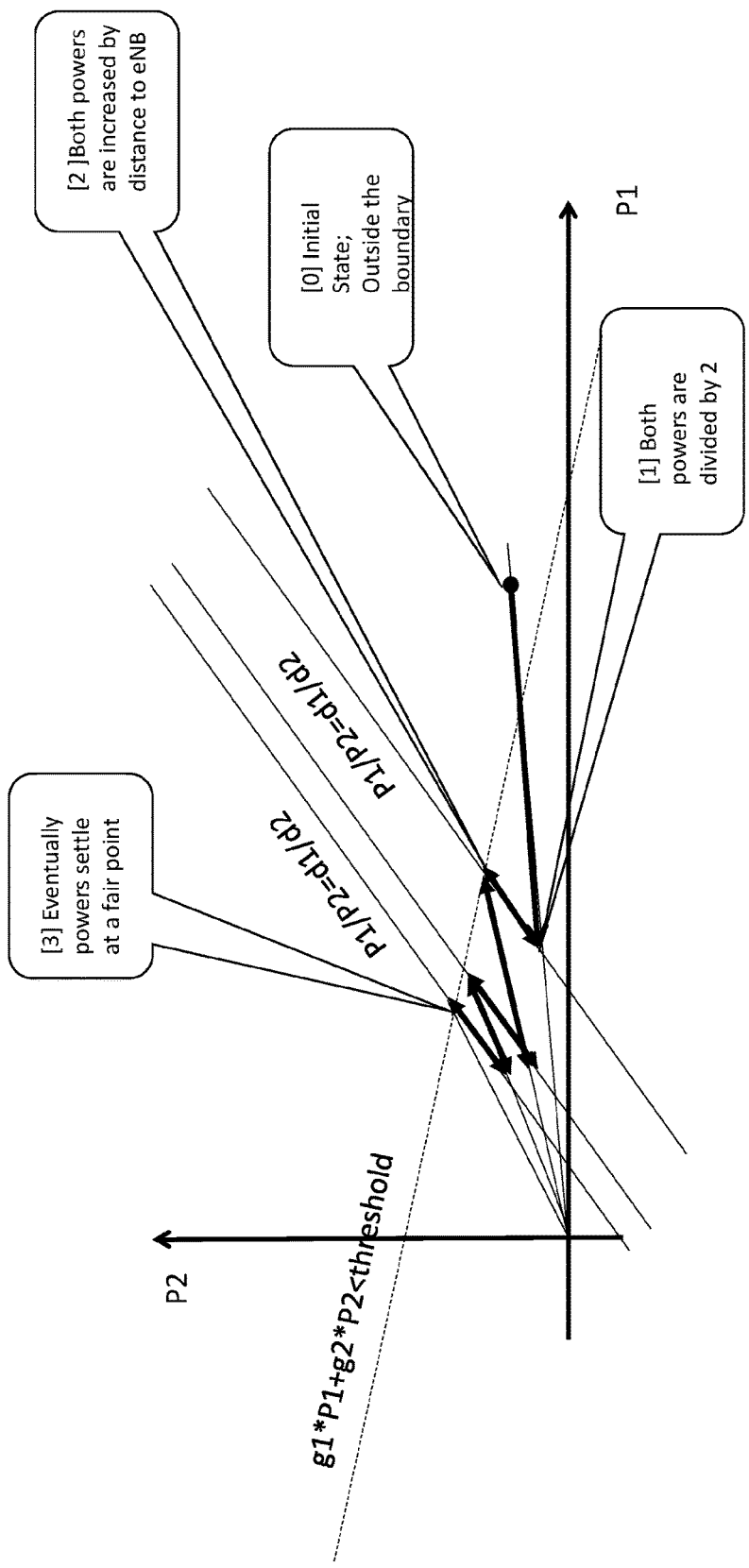
FIG. 8 is a graphic representation of using a modified AIMD method in a D2D communication, according to an embodiment of the present disclosure.

In FIG. 8, an exemplary power adjustment for the devices in FIG. 6, by the AIMD method is illustrated. Assume that in the initial step, D1 and D2's transmitter power are at state [0]. Since the aggregate interference at the eNB 20 is greater than the threshold (the point is outside the dash line), the eNB 20 sends out a POWER_DOWN in the D2D-CM 70. Based on the POWER_DOWN message, both D2D transmitters divide their powers proportional to their distance to the eNB 20, and D1 and D2's transmitter power state moves to state [1]. As long as the interference is below the dash line, the eNB 20 keeps transmitting POWER-UP in the D2D-CMs. This happens over the next few TTIs until the D1 and D2's transmitter power state reaches state [2]. Note that the change from [0] to [1] occurs in one step, but it takes multiple iterations to reach [2] (having started from [1]). The same procedure is continued until the power state reaches state [3] which is an equilibrium state.

Initial Transmission of the D2D UEs:

A D2D UE may be deemed to have no previous transmission history in the following exemplary scenarios:

it has been inactive (no data transmission) for a time span inactivation_span_threshold to be determined as a constant or having a value broadcasted, e.g. as a part of the system information block (SIB);

it has been scheduled by the eNB 20 for a transmission, but it has not transmitted in the allotted resources.

In the case that a D2D UE device has no history, an Initial Transmission (D2D-IT) procedure may be followed by the D2D UE. Such a procedure may comprise:

Selecting a serving eNB. If a serving eNB cannot be found, the D2D UE may stop and/or declare itself as out of coverage. The D2D UE may monitor the reference signal received power (RSRP) and select the eNB with the highest RSRP. Other factors can be taken into account in addition or instead of the RSRP, for the selection of the serving eNB. Such factors may include load measurement (e.g. by monitoring the (lack of) abundance of the D2D-CM's).

Waiting to receive a D2D-CM with a null history_based_identifier field. If the wait time for reception of such a message exceeds a pre-determined time t_wait_null, the D2D UE may proceed to the next step. Otherwise, the D2D UE may stop and follow control commands that may be included in a received D2D-CM for the initial transmission.

Receiving a D2D-CM with history_based_identifier not equal to null. If the wait time for reception of such a message exceeds a constant t_wait_notnull, the D2D UE may proceed to the next step. Otherwise, the D2D UE may stop and follow control commands for scheduling that may be included in the received D2D-CM for the initial transmission;

Declaring the D2D UE as out of coverage

In one embodiment, t_wait_null and t_wait_notnull are broadcasted as a part of system information block. In another embodiment, they are predetermined constants.

D2D Actions in the Case of Collision:

In the previous section, a method to manage the interference of the D2D pairs 50 onto the eNB 20 was discussed. However, a receiving D2D UE 15 might experience high interference (either from other D2D pairs 50 and/or from the WAN UE 25), and it is unable to decode successfully. In this case, it may adopt one the following actions:

In one embodiment, the D2D UE mimics an initial transmission procedure in order to hop on and transmit with a different set of D2D UE's as follows. It waits to receive a D2D-CM with history_based_identifier==null. If the wait time for reception of such a message does not exceed a pre-determined time t_wait_null, follow the control commands included in the received D2D-CM for the initial transmission.

In another embodiment, the receiving device informs the eNB with a HIGH_INTERFERENCE alarm. Upon reception of this signal, the eNB transmits the power down signal to power down all the co-channel D2D transmitters for the next TTI.

In another embodiment, it divides its transmit power by 2. Doing so, the D2D UE might be able to perform SIC to remove the interference from other devices.

Figure 9B:
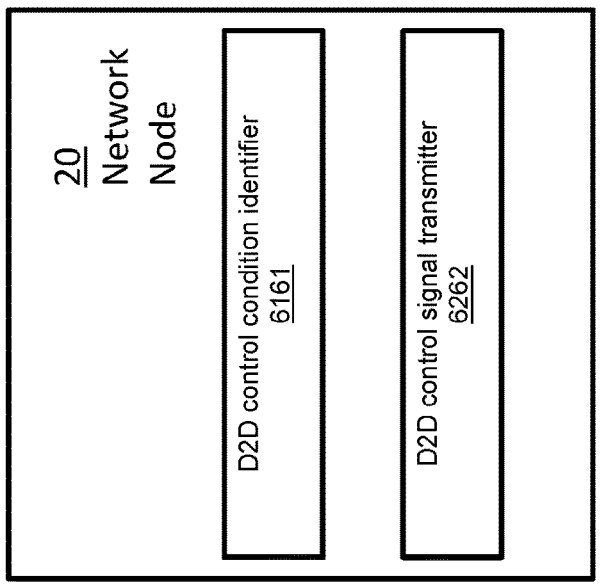
FIGS. 9A and 9B show block diagrams of a network node that enables D2D communication according to some embodiments of the present disclosure.
Figure 9A:
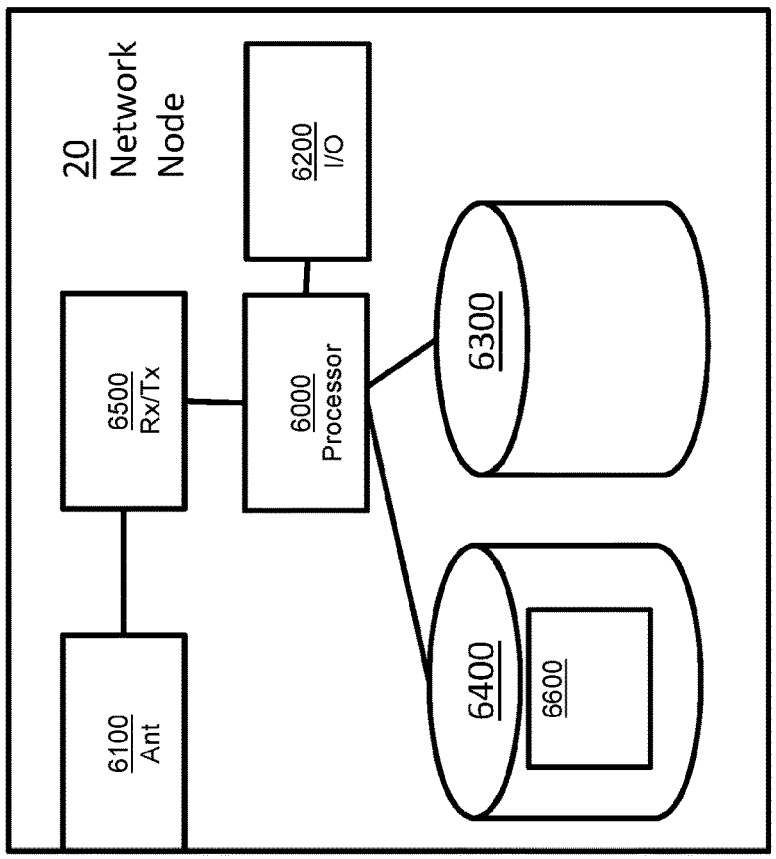

FIG. 9A is a schematic diagram illustrating some components any one of the network nodes described above, here illustrated as a single network node 20.

A processor 6000 is provided using any combination of one or more of a suitable central processing unit (CPU), multiprocessor, microcontroller, digital signal processor (DSP), application specific integrated circuit etc., capable of executing software instructions 6600 stored in a computer program product 6400, e.g. in the form of a memory. The processor 6000 may be configured to execute methods and/or procedures described herein, by executing instructions 6600 stored in the computer program product 6400.

The computer program product 6400 may be a memory or any combination of read and write memory (RAM) and read only memory (ROM). The memory also comprises persistent storage, which, for example, may be any single one or combination of magnetic memory, optical memory, solid state memory or even remotely mounted memory.

The network node 20 further comprises a data memory 6300, which comprises persistent and/or volatile memory for storing data, e.g. used by the instructions 6600 when executed by the processor 6000.

The network node 20 further comprises an I/O interface 6200 for communicating with the core network and optionally with other network nodes.

The network node 20 also comprises one or more transceivers 6500, comprising analogue and digital components, and a suitable number of antennas 6100 for radio communication with UEs/mobile devices within one or more radio cells. The processor 6000 controls the general operation of the radio network node 20, e.g. by sending control signals to the transceiver 65 and receiving reports from the transceiver 6500 of its operation.

Other network nodes, which are not radio network nodes, have the corresponding components to the radio network node, except the transceiver 6500 and the antenna 6100.

Other components of the network node 200 are omitted in order not to obscure the concepts presented herein.

FIG. 9B is a schematic diagram showing functional modules of the software instructions 6600 of the network node 20, of FIG. 9A according to one embodiment. The modules are implemented using software instructions such as a computer program executing in the network node. The modules correspond to the steps in the methods illustrated in FIG. 4. A D2D control condition identifier 6161 is operative to perform step 200. A D2D control signal transmitter 6262 is operative to perform step 202.

Figure 10B:
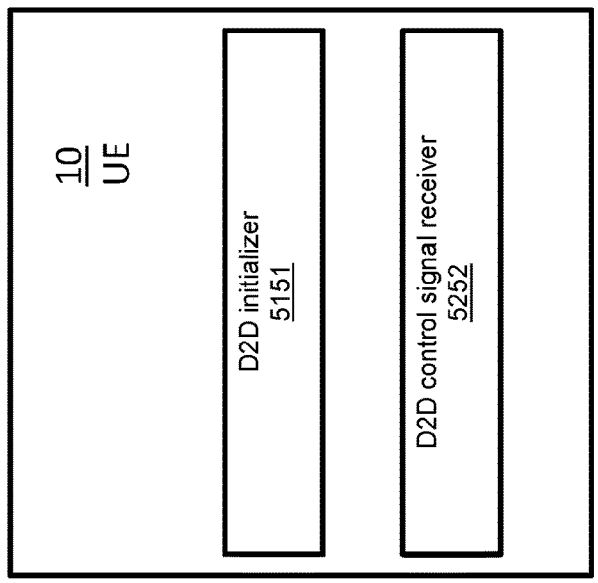
FIGS. 10A and 10B show block diagrams of a user device that enables D2D communication according to some embodiments of the present disclosure.
Figure 10A:
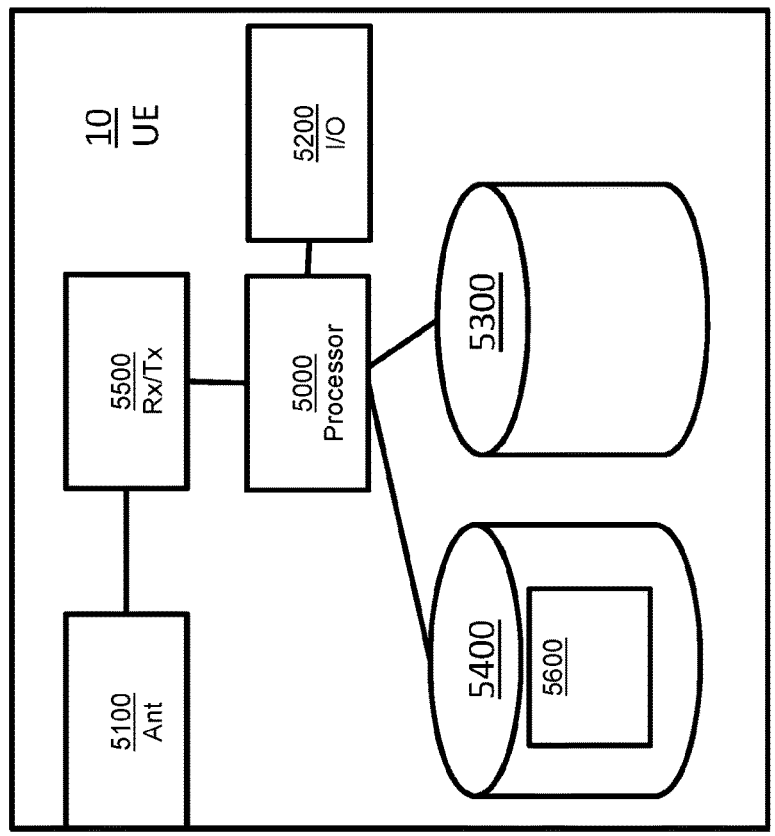

FIG. 10A is a schematic diagram illustrating some components any one of the UEs described above, here illustrated as a single UE 10.

A processor 5000 is provided using any combination of one or more of a suitable central processing unit (CPU), multiprocessor, microcontroller, digital signal processor (DSP), application specific integrated circuit etc., capable of executing software instructions 5600 stored in a computer program product 5400, e.g. in the form of a memory. The processor 5000 may be configured to execute methods and/or procedures described herein, by executing instructions 5600 stored in the computer program product 5400.

The computer program product 5400 may be a memory or any combination of read and write memory (RAM) and read only memory (ROM). The memory also comprises persistent storage, which, for example, may be any single one or combination of magnetic memory, optical memory, solid state memory or even remotely mounted memory.

The UE 10 further comprises a data memory 5300, which comprises persistent and/or volatile memory for storing data, e.g. used by the instructions 5600 when executed by the processor 5000.

The UE 10 further comprises an I/O interface 5200, comprising a user interface and/or local I/O.

The UE 10 also comprises one or more transceivers 5500, comprising analogue and digital components, and a suitable number of antennas 5100 for radio communication with a suitable network node 20. The processor 5000 controls the general operation of the UE 10, e.g. by sending control signals to the transceiver 5500 and receiving reports from the transceiver 5500 of its operation.

Other components of the UE 10 are omitted in order not to obscure the concepts presented herein.

FIG. 10B is a schematic diagram showing functional modules of the software instructions 5600 of the UE 10, of FIG. 10A according to one embodiment. The modules are implemented using software instructions such as a computer program executing in the network node. The modules correspond to the steps in the methods illustrated in FIGS. 4-5. A D2D initializer 5151 is operative to perform step 300. A D2D control signal receiver is operative to perform step 302.

Figure 11:
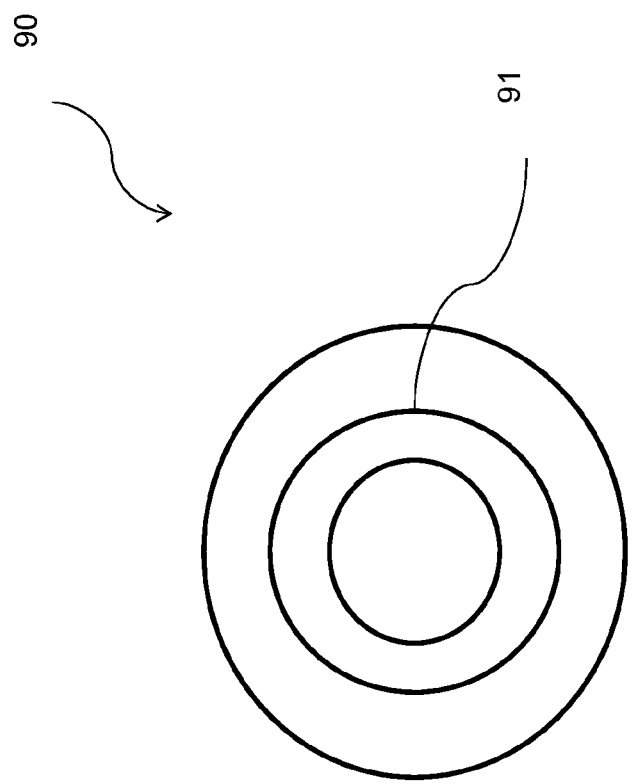
FIG. 11 shows one example of a computer program product 90 comprising computer readable means.

FIG. 11 shows one example of a computer program product 90 comprising computer readable means. On this computer readable means a computer program 91 can be stored, which computer program can cause a processor to execute a method according to embodiments described herein. In this example, the computer program product is an optical disc, such as a CD (compact disc) or a DVD (digital versatile disc) or a Blu-Ray disc. As explained above, the computer program product could also be embodied in a memory of a device, such as the computer program product 66 of FIG. 6. While the computer program 91 is here schematically shown as a track on the depicted optical disk, the computer program can be stored in any way which is suitable for the computer program product, such as a removable solid state memory, e.g. a Universal Serial Bus (USB) drive.

Those skilled in the art will recognize improvements and modifications to the embodiments of the present disclosure. All such improvements and modifications are considered within the scope of the concepts disclosed herein and the claims that follow.

Enumerated Embodiments

In the following a number of non-limiting embodiments will be presented:

Embodiment 1

A method for a network node (20), comprising: identifying (200) a device-to-device (D2D) control condition for broadcasting a control signal (70) to a group of device-to-device (D2D) user devices;
broadcasting (202) the control signal (70) to the group of device-to-device (D2D) user devices, based on the identified control condition, wherein the control signal includes a resources history field indicative of a set of physical resources previously allocated to the group of D2D user devices.

Embodiment 2

The method of embodiment 1, wherein the control signal further includes a resources grant field indicative of a set of physical resources to be used by the group of D2D user devices in subsequent communication.

Embodiment 3

The method of any of embodiments 1 and 2 wherein the control signal further includes a power control field indicative of a set of transmitter power adjustments to be made by the group of D2D user devices in subsequent communication.

Embodiment 4

The method of any of embodiments 1 to 3, further comprising monitoring (204) a collective parameter for the group of D2D user devices and updating the control signal (70) based on the monitoring of the collective parameter.

Embodiment 5

The method of embodiment 3 wherein the set of transmitter power adjustments in the power control field is based on a collective parameter for the group of D2D user devices.

Embodiment 6

The method of embodiment 2 wherein the set of physical resources to be used by the group of D2D user devices in subsequent communication indicated in the grant field is based on the collective parameter.

Embodiment 7

The method of any of embodiments 1 to 6, wherein the resources history field may have at least one null entry that indicates no physical resources have been previously allocated to at least one of the D2D user devices in the group of D2D user devices.

Embodiment 8

The method of embodiment 3 wherein the set of transmitter power adjustments is based on a fairness algorithm.

Embodiment 9

The method of embodiment 3 wherein the set of transmitter power adjustments is based on a relation between a received power of one or more D2D transmissions within the group of D2D user devices and a received power from a wireless access network (WAN) user device.

Embodiment 10

The method of embodiment 3 wherein the power control message comprises an indication for the D2D user devices within the group of D2D user devices to increase their respective transmitter power by a factor proportional to their respective distance to the network node, wherein the distance is either one of a physical distance or electrical distance.

Embodiment 11

The method of any of embodiments 1 to 10 wherein the control signal comprises a cell identifier for a wireless access network (WAN) user device attached to the network.

Embodiment 12

12. A network node (20) for a wireless communication system comprising circuitry containing instructions which when executed cause the network node to:
 identify a device-to-device (D2D) control condition for broadcasting a control signal (70) to a group of device-to-device (D2D) user devices (10); and
 broadcast the control signal (70) to the group of device-to-device (D2D) user devices (10), based on the identified control condition, wherein the control signal (70) includes a resources history field indicative of a set of physical resources previously allocated to the group of D2D user devices.

Embodiment 13

A network node as in embodiment 12, the circuitry further comprising instructions which when executed cause the network node to monitor a collective parameter for the group of D2D user devices and updating the control signal based on the monitoring of the collective parameter.

Embodiment 14

The network node (20) of either embodiments 12 or 13, wherein said circuitry comprises at least one processor (6000) and memory (6400) coupled to said processor, said memory comprising said instructions.

Embodiment 15

A computer readable medium adapted to store instructions, which when executed by one or more processors, cause the one or more processors to carry out the method according to any of embodiments 1-11.

Embodiment 16

A computer program comprising instructions which, when executed on at least one processor (6000), cause the at least one processor (6000) to carry out the method according to any one of embodiments 1-11.

Embodiment 17

A carrier containing the computer program of embodiment 16, wherein the carrier is one of an electronic signal, an optical signal, a radio signal, or a computer readable storage medium.

Embodiment 18

A network node (20) comprising: means for identifying a device-to-device (D2D) control condition for broadcasting a control signal to a group of device-to-device (D2D) user devices; and
 means for broadcasting the control signal to the group of device-to-device (D2D) user devices, based on the identified control condition, wherein the control signal includes a resources history field indicative of a set of physical resources previously allocated to the group of D2D user devices.

Embodiment 19

A network node (20) comprising: a D2D control condition identifier (6161) operative to identify a device-to-device (D2D) control condition for broadcasting a control signal to a group of device-to-device (D2D) user devices; and a D2D control signal transmitter (6262) operative to broadcast the control signal to the group of device-to-device (D2D) user devices, based on the identified control condition, wherein the control signal includes a resources history field indicative of a set of physical resources previously allocated to the group of D2D user devices.

Embodiment 20

A method of operating a D2D user device, comprising: performing (300) a D2D initialization procedure; and receiving (302) from a network node a broadcast control signal, the control signal comprising a resources history field indicative of a set of physical resources previously used by the D2D user device.

Embodiment 21

The method of embodiment 12, wherein the control signal further includes a resources grant field indicative of a set of physical resources to be used by the D2D user device in subsequent communication.

Embodiment 22

The method of embodiment 12, wherein the control signal further includes a power control field indicative of a set of transmitter power adjustments for the D2D user device in subsequent transmissions.

Embodiment 23

The method of any of embodiments 12 to 14, wherein the control signal contains a cell identifier for a wireless access network (WAN) user device attached to the network and the method further comprises processing the control signal upon determining, based on the cell identifier, that the set of physical resources previously used by the D2D user device have also been used by the WAN user device attached to the network node.

Embodiment 24

A user device (10) for D2D communication comprising circuitry containing instructions which when executed cause the network node to:
 perform a D2D initialization procedure; and receive from a network node (20) a broadcast control signal (70), the control signal comprising a resources history field indicative of a set of physical resources previously used by the D2D user device.

Embodiment 25

A user device (10) as in embodiment 24, the circuitry further comprising instructions which when executed cause the network node to process the control signal only if using same resources as an identified WAN user device.

Embodiment 26

The user device (10) of either embodiments 24 or 25, wherein said circuitry comprises at least one processor (5000) and memory (5400) coupled to said processor, said memory comprising said instructions.

Embodiment 27

A computer readable medium adapted to store instructions, which when executed by one or more processors, cause the one or more processors to carry out the method according to any of embodiments 20-23.

Embodiment 28

A computer program comprising instructions which, when executed on at least one processor (6000), cause the at least one processor (6000) to carry out the method according to any one of embodiments 20-23.

Embodiment 29

A carrier containing the computer program of claim 28, wherein the carrier is one of an electronic signal, an optical signal, a radio signal, or a computer readable storage medium.

Embodiment 30

A user device (10) comprising:
 means for performing a D2D initialization procedure; and
 means for receiving from a network node (20) a broadcast control signal (70), the control signal comprising a resources history field indicative of a set of physical resources previously used by the D2D user device.

Embodiment 31

A user device (10) comprising:
 a D2D initializer (5151) operative to perform a D2D performing (300) a D2D initialization procedure; and
 a D2D receiver (5252) operative to receive (302) from a network node (20) a broadcast control signal (70), the control signal comprising a resources history field indicative of a set of physical resources previously used by the D2D user device (10).

The above description is provided to enable persons skilled in the art to implement the various embodiments described and illustrated. The described methods and apparatuses are presented for purpose of illustration and not of limitation. It should be understood that various changes, substitutions and alterations can be made and still fall within the broad scope of the present methods and apparatuses described in this specification. For example, many of the features and functions discussed above can be implemented in software, hardware, or firmware, or a combination thereof. Also, many alternatives, variations, and modifications will be apparent to those of ordinary skill in the art. Other such alternatives, variations, and modifications are intended to fall within the scope of the following appended claims.

The invention claimed is:

1. A method for a network node, comprising: identifying a device-to-device (D2D) control condition for broadcasting a control signal to a group of D2D user devices; broadcasting the control signal to the group of D2D user devices, based on the identified control condition, wherein the control signal includes a resources history field indicative of a set of physical resources previously allocated to the group of D2D user devices, wherein the resources history field may have at least one null entry that indicates no physical resources have been previously allocated to at least one of the D2D user devices in the group of D2D user devices.

2. The method of claim 1, wherein the control signal further includes a resources grant field indicative of a set of physical resources to be used by the group of D2D user devices in subsequent communication.

3. The method of claim 1 wherein the control signal further includes a power control field indicative of a set of transmitter power adjustments to be made by the group of D2D user devices in subsequent communication.

4. The method of claim 1, further comprising monitoring a collective parameter for the group of D2D user devices and updating the control signal based on the monitoring of the collective parameter.

5. The method of claim 3 wherein the set of transmitter power adjustments in the power control field is based on a collective parameter for the group of D2D user devices.

6. The method of claim 2 wherein the set of physical resources to be used by the group of D2D user devices in subsequent communication indicated in the grant field is based on the collective parameter.

7. The method of claim 3 wherein the set of transmitter power adjustments is based on a fairness algorithm.

8. The method of claim 3 wherein the set of transmitter power adjustments is based on a relation between a received power of one or more D2D transmissions within the group of D2D user devices and a received power from a wireless access network (WAN) user device.

9. The method of claim 3 wherein the power control message comprises an indication for the D2D user devices within the group of D2D user devices to increase their respective transmitter power by a factor proportional to their respective distance to the network node.

10. The method of claim 1 wherein the control signal comprises a cell identifier for a wireless access network (WAN) user device attached to the network.

11. A network node for a wireless communication system comprising circuitry containing instructions which when executed cause the network node to: identify a device-to-device (D2D) control condition for broadcasting a control signal to a group of D2D user devices; and broadcast the control signal to the group of D2D user devices, based on the identified control condition, wherein the control signal includes a resources history field indicative of a set of physical resources previously allocated to the group of D2D user devices, wherein the resources history field may have at least one null entry that indicates no physical resources have been previously allocated to at least one of the D2D user devices in the group of D2D user devices.

12. A network node as claimed in claim 11, the circuitry further comprising instructions which when executed cause the network node to monitor a collective parameter for the group of D2D user devices and updating the control signal based on the monitoring of the collective parameter.

13. The network node of claim 11, wherein said circuitry comprises at least one processor and memory coupled to said processor, said memory comprising said instructions.

14. A method of operating a device-to-device (D2D) user device, comprising: performing a D2D initialization procedure; and receiving from a network node a broadcast control signal, the control signal comprising a resources history field indicative of a set of physical resources previously used by the D2D user device, wherein the resources history field may have at least one null entry that indicates no physical resources have been previously allocated to at least one D2D user device in a group of D2D user devices.

15. The method of claim 11, wherein the control signal further includes a resources grant field indicative of a set of physical resources to be used by the D2D user device in subsequent communication.

16. The method of claim 11, wherein the control signal further includes a power control field indicative of a set of transmitter power adjustments for the D2D user device in subsequent transmissions.

17. The method of claim 11, wherein the control signal contains a cell identifier for a wireless access network (WAN) user device attached to the network and the method further comprises processing the control signal upon determining, based on the cell identifier, that the set of physical resources previously used by the D2D user device have also been used by the WAN user device attached to the network node.

18. A user device for device-to-device (D2D) communication comprising circuitry containing instructions which when executed cause the user device to: perform a D2D initialization procedure; and receive from a network node a broadcast control signal, the control signal comprising a resources history field indicative of a set of physical resources previously used by the D2D user device: wherein the resources history field may have at least one null entry that indicates no physical resources have been previously allocated to at least one D2D user device in a group of D2D user devices.

19. The user device as claimed in claim 18, the circuitry further comprising instructions which when executed cause the user device to process the control signal only if using same resources as an identified WAN user device.

20. The user device of claim 18, wherein said circuitry comprises at least one processor and memory coupled to said processor, said memory comprising said instructions.

* * * * *